（12） United States Patent
Starr et al.

(10) Patent No.: US 7,979,535 B2
(45) Date of Patent: Jul. 12, 2011

(54) METHODS, SYSTEMS, AND COMPUTER PROGRAM PRODUCTS FOR MONITORING COMMUNICATIONS AND TAKING A RESPONSIVE ACTION

(75) Inventors: Robert Starr, Decatur, GA (US); Samuel Zellner, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 852 days.

(21) Appl. No.: 11/749,299

(22) Filed: May 16, 2007

(65) Prior Publication Data

US 2008/0288628 A1      Nov. 20, 2008

(51) Int. Cl.
  *G06F 15/173*   (2006.01)
  *G06F 15/16*    (2006.01)
  *H04M 3/42*     (2006.01)
  *G06F 17/27*    (2006.01)

(52) U.S. Cl. ............. 709/224; 709/208; 455/417; 704/9
(58) Field of Classification Search ........................ None
  See application file for complete search history.

(56) References Cited

U.S. PATENT DOCUMENTS

2007/0032225 A1* 2/2007 Konicek et al. ............... 455/417
2009/0234639 A1* 9/2009 Teague et al. ..................... 704/9
* cited by examiner

*Primary Examiner* — Wen-Tai Lin
(74) *Attorney, Agent, or Firm* — Cantor Colburn LLP (57) ABSTRACT

Exemplary embodiments include a device for monitoring communications and taking a responsive action including: a receiver operable for receiving an input signal from a user; a transmitter operable for transmitting an output signal to a communications network and a command signal to a secondary device; and a processor in operable communication with the receiver and the transmitter. The processor is operable for monitoring the input signal for an event and responsively instructing the transmitter to transmit the command to the secondary device.

20 Claims, 4 Drawing Sheets

METHODS, SYSTEMS, AND COMPUTER PROGRAM PRODUCTS FOR MONITORING COMMUNICATIONS AND TAKING A RESPONSIVE ACTION

BACKGROUND

The present disclosure relates to methods, systems, and computer program products for monitoring communications. More specifically, the present disclosure relates to methods, systems, and computer program products for monitoring a communications session for an event and taking a responsive action upon detection of the event.

Currently, people are constantly surrounded with and use a variety of communications devices for a wide range of activities and varying forms of communication. These communications devices typically allow a user to establish a communications session with one or more third parties, via a communications network. The communications devices are designed to primarily communicate with a third party over the communications network. Some communications devices are also able to communicate with other devices located near them, such as Bluetooth™ headsets or laptop computers.

Communications devices are used to facilitate communication between a user and a third party. It is often the case that a user of a communications device desires specific actions to be taken involving one or more secondary devices depending upon one or more characteristics of his/her use of the communications device. Currently, the user must individually execute the desired actions of the secondary devices.

Accordingly, it is desirable to develop a communications device capable of monitoring a communications session for an event and communicating with secondary devices located within the vicinity of the communications device to cause specific actions to be taken by one or more of the secondary devices.

SUMMARY

Exemplary embodiments include a device for monitoring communications and taking a responsive action including: a receiver operable for receiving an input signal from a user; a transmitter operable for transmitting an output signal to a communications network and a command signal to a secondary device; and a processor in operable communication with the receiver and the transmitter. The processor is operable for monitoring the input signal for an event and responsively instructing the transmitter to transmit the command to the secondary device.

Exemplary embodiments also include a method for monitoring a communications session and taking a responsive action including: establishing the communications session between a communications device and a communications network; monitoring the communications session for an event; detecting the event during the communications session; and transmitting a command to a secondary device responsive to the detection of the event.

Further exemplary embodiments include a computer program product for monitoring a communications session and taking a responsive action including a storage medium readable by a processing circuit, and storing instructions for execution by the processing circuit for facilitating a method including: establishing the communications session between a communications device and a communications network; monitoring the communications session for an event; detecting the event during the communications session; and transmitting a command to a secondary device responsive to the detection of the event.

Yet further exemplary embodiments include a system for monitoring communications and talking a responsive action including: a communications device in operable communication with a customer premises equipment; a communications network in operable communication with the customer premises equipment; a secondary device in operable communication with the customer premises equipment; and wherein the customer premises equipment monitors a communications session between the communications device and the communications network for an event and transmits a command to the secondary device in response to the event.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several Figures.

DETAILED DESCRIPTION

Referring now to the Figures for the purpose of illustration, it is to be understood that standard components or features that are within the purview of an artisan of ordinary skill and do not contribute to the understanding of the various exemplary embodiments are omitted from the Figures to enhance clarity.

Figure 1:
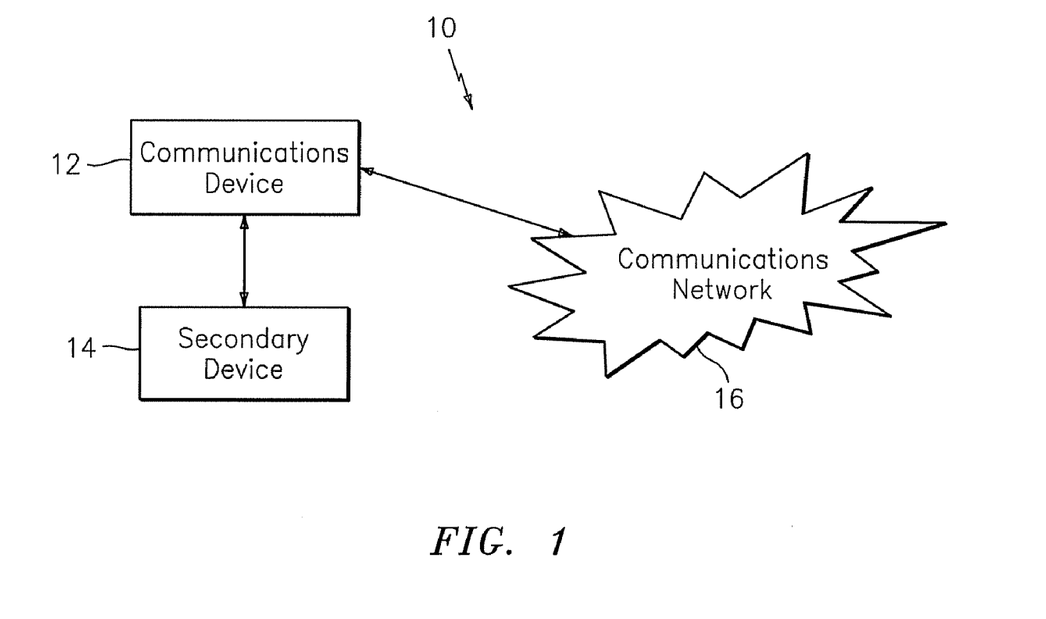
FIG. 1 illustrates a block diagram of a system for monitoring communications and taking a responsive action in exemplary embodiments.

FIG. 1 illustrates a block diagram of a system for monitoring communications and taking a responsive action in exemplary embodiments, which is depicted generally as 10. The system 10 includes a communications device 12 in operable communication with both a secondary device 14 and a communications network 16. The communications device 12 can be any suitable communications device including a VoIP (Voice over Internet Protocol) phone, a cellular phone, a PDA, a computer, a Blackberry™, or the like. The communications network 16 can include, but is not limited to, the Internet, a traditional telephone network, a local area network, a wide area network, a cellular phone network, or the like. Furthermore, the secondary device 14 can be any device that is in operable communication with the communications device 12 that is capable of taking an action in response to a command from the communications device 12. In exemplary embodiments, the secondary device 14 may be a home security system, a secondary communications device, a VoIP phone, a cellular phone, a PDA, a Blackberry™, a computer, or the like. In exemplary embodiments, the communications device 12 may communicate with the communications network 16 either through a wired or a wireless connection. For example, the connection may be a DSL connection, a cable connection, a POTS connection, an 802.X connection, a Bluetooth™ connection, or the like. Likewise, the communications device 12 may communicate with the secondary device 14 either through a wired or a wireless connection. For example, the connection may be a LAN connection, an 802.X connection, a Bluetooth™ connection, or the like. Although only one communications device 12 and one secondary device 14 are shown in FIG. 1 for ease of illustration, it should be appreciated that any number of communications devices 12 and secondary devices 14 may be used.

Figure 2:
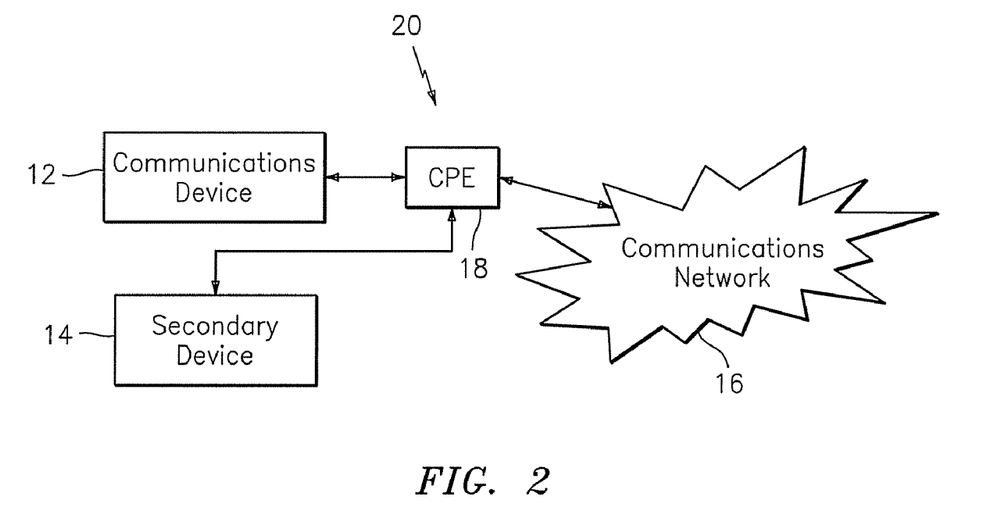
FIG. 2 illustrates a block diagram of another system for monitoring communications and taking a responsive action in exemplary embodiments.

Turning now to FIG. 2, another system for monitoring communications and taking a responsive action in exemplary embodiments is depicted generally as 20. The system 20 includes at least one communications device 12 in operable communication with customer premises equipment 18. The customer premises equipment 18 is in operable communication with at least one secondary device 14 and a communications network 16. In exemplary embodiments, the customer premises equipment 18 may be, but is not limited to, a switch, a router, a cable modem, a DSL modem, or the like. In exemplary embodiments, the customer premises equipment 18 may include an internal power supply, which enables it to continue operation in the event of a loss of power to communications device 12. The customer premises equipment 18 may also maintain communications with communications network 16 in the event that a communications link with the communications device 12 is disrupted.

In exemplary embodiments, the communications device 12 or the customer premises equipment 18, depending upon the configuration of the system for monitoring communications and taking a responsive action, monitors a communications session between the communications network 16 and the communications device 12 for an event. The communications session may include, but is not limited to, a voice call, an email, an Instant Messaging (IM) chat, a Short Message Service (SMS), or the like. In exemplary embodiments, the event may include, but is not limited to, a specific keystroke or series of keystrokes during the communications session, the use of a specific content (e.g., the use of a word or phrase) during the communications session, a duration of the communications session, a time of the communications session, or the like. In one embodiment, the event may include the establishment of the communications session with a particular third party (e.g., the communications device 12 or customer premises equipment 18 may sense that a specific address is being accessed). Upon the detection of an event the communications device 12 or the customer premises equipment 18 responsively transmits a command signal to the secondary device 14. For example, an event may be detected if the communications device 12 or the customer premises equipment 18 senses that the user is attempting to access emergency services (e.g., the user dials 911), a command signal may be transmitted to a security system instructing the security system to take a specific action (e.g., activate an alarm, activate video cameras, lock/unlock doors, or the like).

In exemplary embodiments, the communications device 12 or the customer premises equipment 18, depending upon the configuration of the system for monitoring communications and taking a responsive action, may include an event/action database. The event/action database correlates the actions that the communications device 12 or the customer premises equipment 18 takes upon the detection of an event. The event/action database may include one or more records, which each comprise an event and at least one corresponding action. The records may include multiple actions to be taken in response to the detection of a corresponding event. In exemplary embodiments, the record may include a priority list of actions and/or one or more conditional actions. The priority list of actions may be used when the user desires a series of actions to be executed in a specific order upon the detection of an event. For example, if the user is attempting to access emergency services, a user may wish for a primary emergency contact to be alerted either before or after a command signal is sent to a security system. Likewise, the record may include one or more conditional actions, which may be conditioned upon the successful execution of other actions or upon various external factors. For example, if the user is attempting to access emergency services, a user may wish for a secondary emergency contact to be alerted only if the communications device 12 or the customer premises equipment 18 was unable to alert a primary emergency contact. In another example, a user may wish to have exterior lights activated if an event, such as the attempted access of emergency services, is detected during the nighttime and not during the daytime.

In exemplary embodiments, the conditional actions can be conditioned upon a wide variety and various combinations of one or more external factors including, but not limited to, the time of day, the presence of a device in a designated area, the status of other local devices, and the like. For example, a user may wish to be notified upon the detection of an event if the user is not located within a designated area. In one embodiment, the user may set up the communications device 12 or the customer premises equipment 18 to check if the user's cellular phone is within a designated area and if it is not, the user may be alerted to the detection of an event. In exemplary embodiments, Bluetooth™, 802.X, or other communications protocols may be used to determine if the user's cellular phone is within the designated area. In another embodiment, the user may set different actions to be taken based upon the time the event is detected (e.g., when the user is at work, the user may set up the communications device 12 or the customer premises equipment 18 to alert him/her of the detected event). Furthermore, the user may elect to be notified of the detection of an event through different means during different times of the day. For example, the user may wish to be notified by email or an Instant Message during the workday and through a Short Message Service (SMS) or an automated voice call during off hours.

In exemplary embodiments, upon the detection of an event, the communications device 12 or the customer premises equipment 18, depending upon the configuration of the system for monitoring communications and taking a responsive action, may consecutively or simultaneously execute multiple actions. The actions can be designed to control auxiliary communications devices within a designated area. In one embodiment, if a user attempts to access emergency services the communications device can transmit commands to other communications devices instructing them to turn off, ignore a communications session, or the like. For example, if a user in one portion of a house calls 911 they may desire that a dial tone or no sound at all be played if another telephone receiver in the house is picked up. In exemplary embodiments, if there are several VoIP phones in an office or home and one of the phones detects that a user is attempting to access emergency services, that phone may transmit commands to the other VoIP phones. The commands may turn off the other VoIP phones completely or instruct the other VoIP phones to not reflect the use of the phone attempting to access emergency services.

Additionally, the communications device 12 may disable other devices within a designated area to ensure that the communications device 12 can be used. For example, the communications device 12 can be a wireless communications device, which uses a shared wireless channel during normal operation, and upon the detection of an event the communications device 12 may instruct other wireless devices that it shares the wireless channel with to remain idle for a requested period of time. Likewise, the communications device 12 may be a wired communications device using a shared wired network, such as an Ethernet or Token Ring, and may request exclusive use of the shared network for a period of time. In another example, the communications device 12 can be a VoIP phone and upon the detection of an event the communications device 12 may instruct other IP devices on network to remain idle for a requested period of time to ensure the availability of enough bandwidth for the communications device 12.

Other actions that the communications device 12 or the customer premises equipment 18 may instruct secondary devices 14 to execute include, but are not limited to, turning on or off secondary devices (e.g., surveillance equipment, communications devices, and the like), activating security and/or safety protocols (e.g., turning on interior and/or exterior lights or alarms, locking and/or unlocking doors and/or windows), transmitting notification that an event has been detected, and the like. In another embodiment, the communications device 12 or the customer premises equipment 18 may re-route one or more communications sessions upon the detection of an event. For example, a user may desire to not allow outgoing calls either during a specified time or to a specific number or class of numbers, and may program the communications device 12 or the customer premises equipment 18 to automatically re-route or drop the attempted restricted calls. In one embodiment, the calls may be redirected to another telephone number or to a system that alerts the caller that a restriction has been placed on the communications device 12. Further, the communications device 12 or the customer premises equipment 18 can be programmed to alert the user and/or a third party that a restricted call was attempted. For example, a user may program the communications device 12 or the customer premises equipment 18 to not allow phone calls during a specific time period and upon the detection of an attempted phone call during that period the communications device may alert the user to the detection of the attempted call.

In exemplary embodiments, a user may add, delete, and/or modify the records in the event/action database. The event/action database may be stored by the communications device 12 or the customer premises equipment 18 and may be accessed by the user through a user interface. The user interface may be in the form of a webpage that the user can access using a traditional web browser. For example, the communications device 12 or the customer premises equipment 18 may have an IP address, which the user may utilize to connect to the communications device 12 or the customer premises equipment 18 and access the event/action database.

Figure 3:
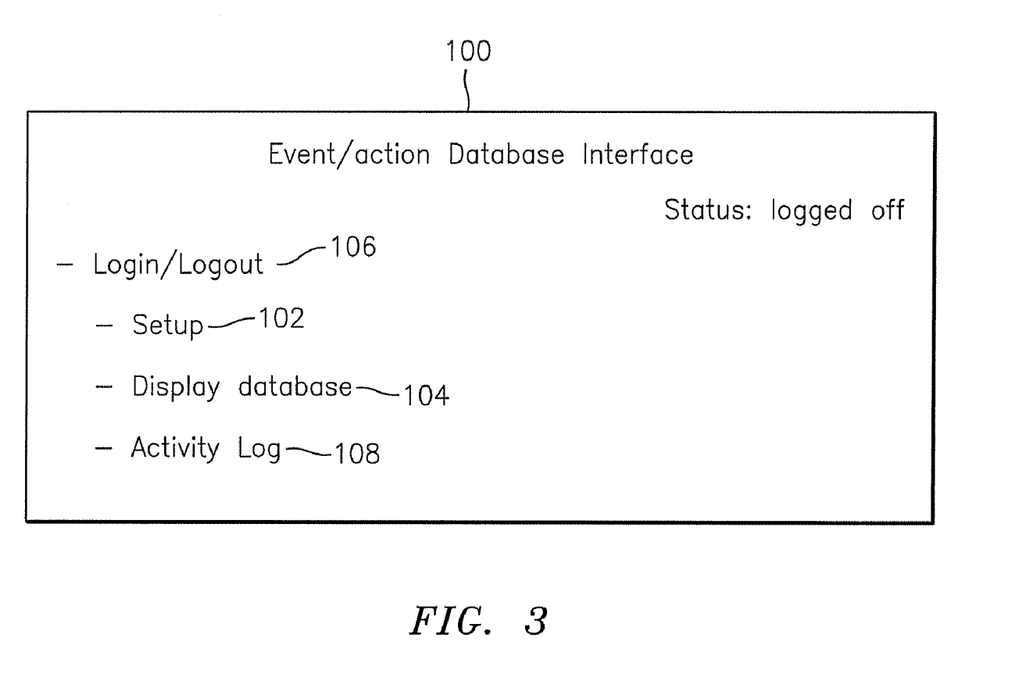
FIG. 3 illustrates a user interface of a communications device in accordance with exemplary embodiments.

FIG. 3 illustrates a user interface 100 for the event/action database in accordance with exemplary embodiments. In exemplary embodiments, the user interface 100 for the event/action database includes a setup option 102, a display option 104, a security function 106, and an activity log 108. The setup option 102 allows a user to set up auxiliary devices that are able to receive commands from the communications device 12 or the customer premises equipment 18. For example, the setup option 102 may discover new devices and query them to determine what type of actions they are capable of executing. The user interface 100 also includes a display event/action database option 104, which when selected displays a list of all of the events that are being monitored and the corresponding actions that will be taken upon the detection of the event. In exemplary embodiments, the user interface 100 may also include a security function 106 (e.g., a login or identification verification function) that allows a user to restrict access to the event/action database. For example, the user interface 100 may disable all functions or certain functions unless a user successfully uses the security feature 106. Furthermore, the user interface 100 may include an activity log 108 that includes a log of detected events and actions responsively taken.

Figure 4:
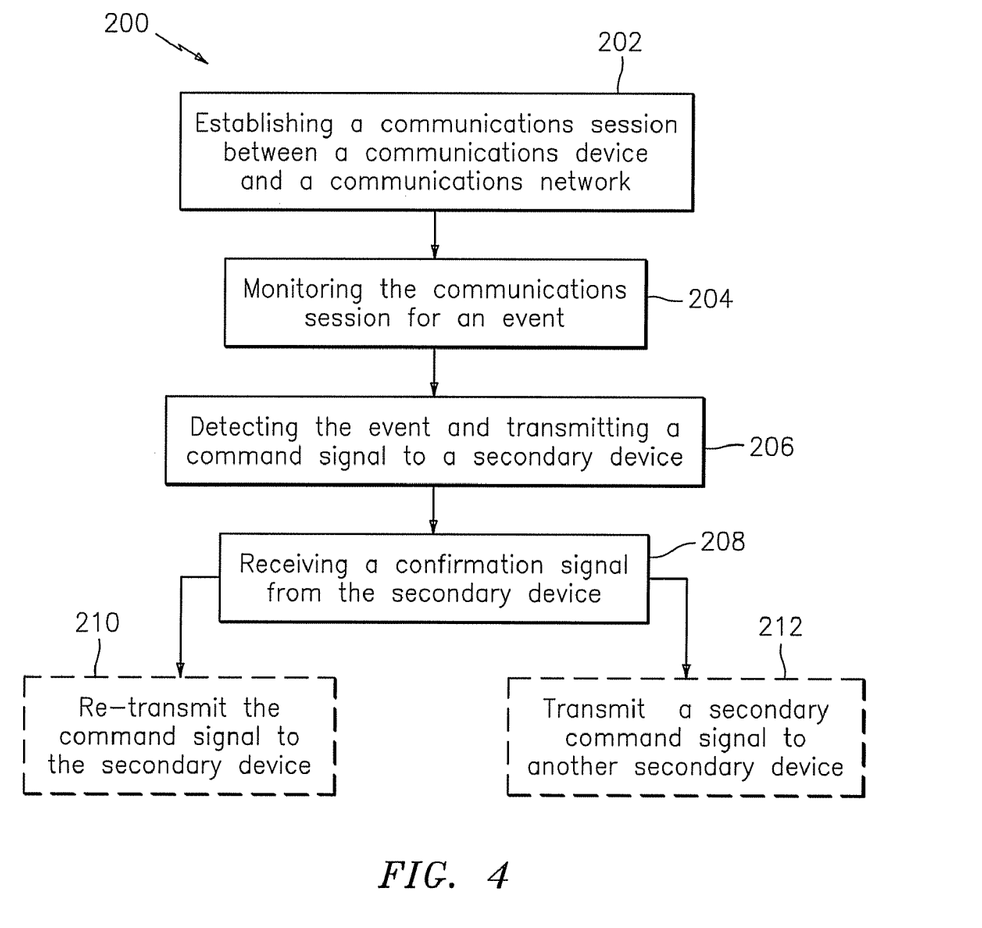
FIG. 4 illustrates a flow chart of a method for providing for monitoring communications and taking a responsive action in exemplary embodiments.

Turning now to FIG. 4, a flow chart of a method for providing for monitoring communications and taking a responsive action in exemplary embodiments is depicted generally as 200. The method 200 includes establishing a communications session between a communications device and a communications network, as shown at process step 202. In exemplary embodiments, the communications session may include, but is not limited to, a voice call, an email, an Instant Messaging (IM) chat, a Short Message Service (SMS), or the like. The method 200 also includes monitoring the communications session for an event, as shown at process step 204. In exemplary embodiments, the event may include, but is not limited to, a specific keystroke or series of keystrokes during the communications session, the use of a specific content (e.g., the use of a word or phrase) during the communications session, a duration of the communications session, a time of the communications session, or the like.

Continuing with reference to FIG. 4, upon detecting the event, the method 200 includes transmitting a command signal to a secondary device, as shown at process step 206. The command signal may be indicative of a desired action of the secondary device. In exemplary embodiments, the method 200 may include determining if a confirmation signal has been received from the secondary device indicating that the desired action was executed, as shown at decision box 208. In exemplary embodiments, if the communications device does not receive the confirmation signal, the communications device may either re-transmit the command signal to the secondary device or transmit a second command signal to another secondary device, as shown at process steps 210 and 212 respectively. For example, the communications device may transmit a command signal to a secondary device and wait a specified amount of time for a confirmation signal from the secondary device and, if the confirmation signal is not timely received, the communications device may be programmed to either re-send the command signal or take a secondary action.

In an exemplary embodiment, the communications device 12 may be an Internet Protocol Television (IPTV), and the event may be the detection of a threshold of dropped IP packets. Once the communications device 12 or the customer premises equipment detects that the number of dropped IP packets exceeds a given threshold, it may transmit a command signal to other local IP devices instructing the devices to reduce the bandwidth that they are using. Additionally, the IPTV may alert a third party to the detection of the event if the instruction to the other devices does not result in a reduction in the number of dropped IP packets. The third party may be a content provider or a communications network. For example, the content provider may be alerted to reduce the transmission rate of the IP packets being sent to the IPTV and the communications network may be alerted to inform the communications network of possible congestion in the communications network.

In another exemplary embodiment, the communications device 12 or the customer premises equipment 18 may be programmed to detect a loss of power or a loss of communications with the communications network 16 and take a responsive action. For example, upon the detection of a loss of power, the communications device 12 or the customer premises equipment 18 may transmit a command to an alternate power source, such as a generator, instructing it to begin providing emergency power. In another example, upon the detection of a loss of communications the communications device 12 or the customer premises equipment 18 may alert the user to the loss of communications, attempt to re-establish communications with the communications network 16, or establish an connection with an alternate communications network (e.g., a cellular phone network).

Figure 5:
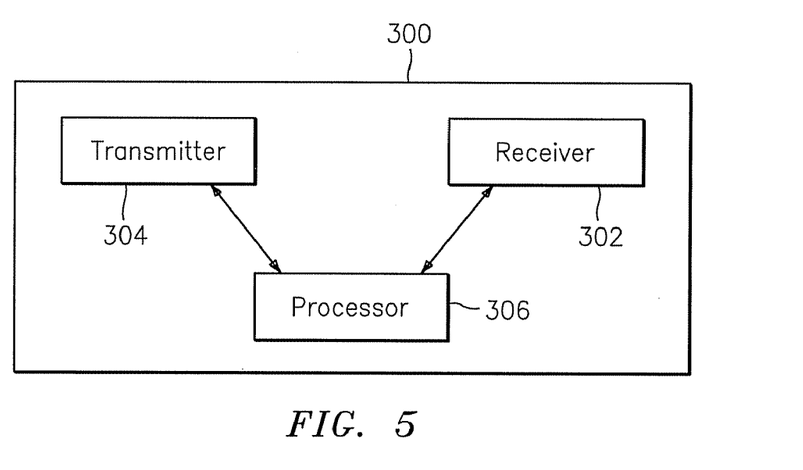
FIG. 5 illustrates a device for monitoring communications and taking a responsive action in accordance with exemplary embodiments.

Turning now to FIG. 5, an exemplary embodiment of a device 300 for monitoring a communications session and taking a responsive action is illustrated. The device 300 includes a receiver 302, a transmitter 304, and a processor 306. The receiver 302 is operable for receiving an input signal from a user. The transmitter 304 is operable for transmitting an output signal to a communications network and a command signal to a secondary device. The processor 306 is in operable communication with the receiver 302 and the transmitter 304. The processor 306 is operable for monitoring the input signal for an event and responsively instructing the transmitter 304 to transmit the command to the secondary device. In exemplary embodiments, the receiver 302 and the transmitter 304 may be discrete or may be combined into a single transceiver. Further, the receiver 302 and the transmitter 304 can be designed to communicate using a wide range of communications protocols including, but not limited to, wireless (e.g., radio-frequency (RF), infrared (IR), ultra high-frequency (UHF), very high-frequency (VHF), and the like), wired (e.g., Ethernet, POTS, and the like), or any combination of the preceding.

Figure 6:
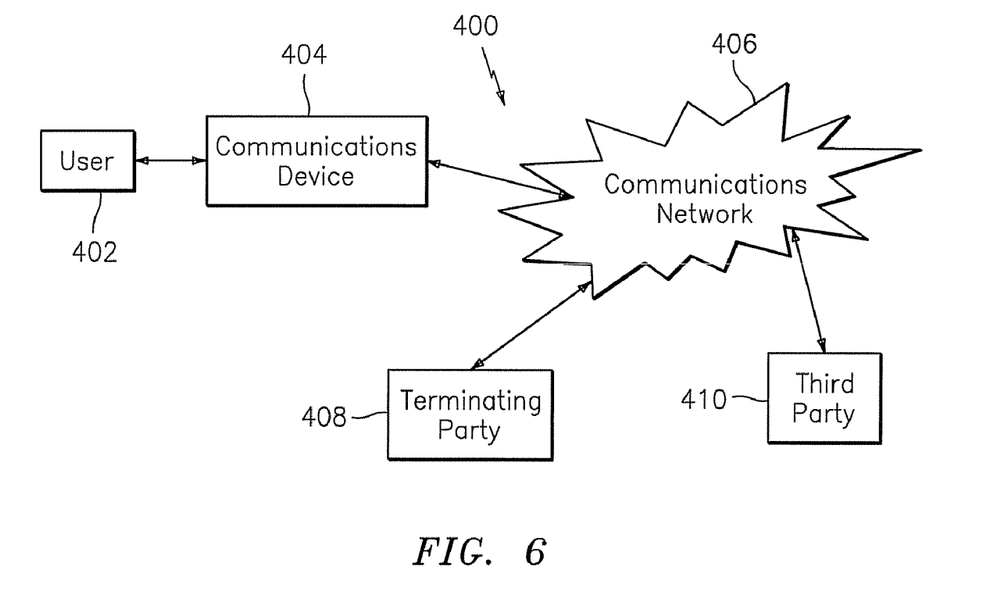
FIG. 6 illustrates a block diagram of a system for monitoring communications and taking a responsive action in accordance with exemplary embodiments.

Referring now to FIG. 6, a block diagram of a system for monitoring communications and taking a responsive action in accordance with exemplary embodiments is illustrated generally as 400. The system 400 includes a user 402, a communications device 404, a communications network 406, a terminating party 408, and a third party 410. The communications device 404, the terminating party 408, and the third party 410 are all in operable communication with the communications network 406. The user 402 is in operable communication with the third party 410 via the communications device 404 and the communications network 406. The communications device 404 monitors the communications between the user 402 and the terminating party 410 for an event. Upon the detection of an event the communications device 404 communicates a command to the third party 408 via the communications network 406. The communications device 404 may communicate with the terminating party 408 and the third party 410 using the same or different means. In other words, the communications network 406 may include several different communications channels that may be used in series, parallel, or a combination of the two. The communication network 406 may include, but is not limited to, BlueTooth™, LAN, Ultra Wideband, wireless local loop, cable network, broadcast transmission, multicast, IP, or the like. The command sent to the third party 408 may include various information including, but not limited to, the name of the user 402, the type of communications being monitored by the communications device 404, the address of the user 402, a priority level, a time of the detected event, an encryption key, a content of the communications between the user and the terminating party, an emergency code, an action request, or the like.

In exemplary embodiments the third party 408 may collect, retrieve, and/or distribute information relating to the detected event. For example, the third party 410 may collect information and distribute it to people locate at the site, going to the site, monitoring the site or to be impacted by the event (e.g., hospital expecting to receive a large number of people because there was an emergency call about a fire or anthrax outbreak). In one embodiment, the third party 410 could send video to a display device to inform the user 402 or people in the area the best way out of a building, or information on what kind of medical assistance to provide. The system 400 might inform other systems to retrieve medical data for the user 402 or someone referenced by the user 402 and distribute that data to a local hospital. The system 400 might also distribute security access information to appropriate parties so emergency personnel can access the building, access medical records, and the like.

Exemplary embodiments may include systems, methods and computer-implemented processes and apparatuses for practicing those processes. Embodiments may also include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments may further include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention.

What is claimed is:
1. A device, comprising:
a receiver operable for receiving an input signal from a communications network;
a transmitter operable for transmitting a command to a secondary device responsive to the input signal;
a user interface configured to permit a user to define an event and the command, wherein multiple commands are configurable for a single event through the user interface, the multiple commands specifying a priority list of commands and conditional actions for execution, as configured by the user; and
a processor in operable communication with the receiver and the transmitter, the processor is operable for moni- toring the input signal for the event and responsively instructing the transmitter to transmit the command to the secondary device;

wherein the user interface includes a setup option configured to discover devices that include the secondary device and query the devices, the query operable for determining types of actions the devices are capable of executing.

2. The device of claim 1, wherein the device is an Internet Protocol television device, the event is a detection of a threshold number of dropped Internet Protocol packets, and the multiple commands include:

transmitting an instruction to at least one other local IP device to reduce the bandwidth used by the at least one other local IP device; and alerting a third party system to the detection of the threshold number of dropped IP packets when an instruction to the at least one other local IP device does not result in a reduction in the threshold number of dropped IP packets.

3. The device of claim 1, wherein:

the priority list of commands executes a series of actions in an order specified by the user upon detection of the event; and the conditional actions comprise actions conditioned upon successful execution of other actions.

4. The device of claim 1, wherein the input signal is a communications session and the event is selected by the user from a listing of events, the listing of events including:

a duration of the communications session;
a time of the communications session; and
establishment of the communications session with a specified third party system.

5. The device of claim 1, wherein the command instructs the secondary device to send a video to a display of the device.

6. The device of claim 5, wherein the event is an emergency at a physical location of the device, and the command instructs the secondary device to send a video to a display of the device, the video illustrating an escape route through the location of the device.

7. A method for monitoring a communications session and taking a responsive action comprising the following computer-implemented steps:

defining an event and a command corresponding to the event, wherein multiple commands are configurable for a single event through a user interface, the multiple commands specifying a priority list of commands and conditional actions for execution, as configured by a user via the user interface;

monitoring a communications session between a communications device and a communications network for the event;

detecting the event during the communications session; and transmitting at least one command to a secondary device responsive to the detection of the event;

wherein the user interface includes a setup option configured to discover devices that include the secondary device and query the devices, the method further comprising determining types of actions the devices are capable of executing based upon the query.

8. The method of claim 7, wherein:

the priority list of commands executes a series of actions in an order specified by the user upon detection of the event; and the conditional actions comprise actions conditioned upon successful execution of other actions.

9. The method of claim 7, wherein the event is selected by the user from a listing of events, the listing of events including:

a duration of the communications session;
a time of the communications session; and
establishment of the communications session with a specified third party system.

10. The method of claim 7, wherein the command instructs the secondary device to send a video to a display of the device.

11. The method of claim 7, wherein the event is an emergency at a physical location of the device, and the command instructs the secondary device to send a video to a display of the device, the video illustrating an escape route through the location of the device.

12. The method of claim 7, wherein the command instructs the secondary device to establish a secondary communications session.

13. The method of claim 7, wherein the communications device communicates with communication network via customer premises equipment, and the customer premises equipment monitors the communications session between the communications device and the communications network, the customer premises equipment comprising at least one of:

a switch;
a router;
a cable modem; and
a digital subscriber line modem.

14. A computer program product for monitoring a communications session and taking a responsive action comprising:

a storage medium readable by a processing circuit and storing instructions for execution by the processing circuit for facilitating a method comprising:

defining an event and a command corresponding to the event, wherein multiple commands are configurable for a single event through a user interface, the multiple commands specifying a priority list of commands and conditional actions for execution, as configured by a user via the user interface;

monitoring a communications session between a communications device and a communications network for the event;

detecting the event during the communications session; and transmitting at least one command to a secondary device responsive to the detection of the event;

wherein the user interface includes a setup option configured to discover devices that include the secondary device and query the devices, the method further comprising determining types of actions the devices are capable of executing based upon the query.

15. The computer program product of claim 14, wherein:

the priority list of commands executes a series of actions in an order specified by the user upon detection of the event; and the conditional actions comprise actions conditioned upon successful execution of other actions.

16. The computer program product of claim 14, wherein the event is selected by the user from a listing of events, the listing of events including:

a duration of the communications session;
a time of the communications session; and
establishment of the communications session with a specified third party system.

17. The computer program product of claim 14, wherein the secondary device is a home security system.

18. The computer program product of claim 14, wherein the secondary device is a secondary communications device.

19. The computer program product of claim 14, wherein the command instructs the secondary device to establish a secondary communications session.

20. The computer program product of claim 14, wherein the communications device communicates with communication network via customer premises equipment, and the customer premises equipment monitors the communications session between the communications device and the communications network.

* * * * *